(12) United States Patent
Shiono et al.

(10) Patent No.: US 11,741,394 B2
(45) Date of Patent: Aug. 29, 2023

(54) INFORMATION PROCESSING METHOD, INFORMATION PROCESSING APPARATUS, AND ABNORMALITY DETERMINATION SYSTEM

(71) Applicant: HONDA MOTOR CO., LTD., Tokyo (JP)

(72) Inventors: Satoshi Shiono, Wako (JP); Yu Takiguchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 437 days.

(21) Appl. No.: 17/178,278

(22) Filed: Feb. 18, 2021

(65) Prior Publication Data
US 2021/0287135 A1    Sep. 16, 2021

(30) Foreign Application Priority Data

Mar. 11, 2020    (JP) ................................ 2020-042046

(51) Int. Cl.
| | |
|---|---|
| G06N 20/00 | (2019.01) |
| G07C 5/00 | (2006.01) |
| G05B 23/02 | (2006.01) |

(52) U.S. Cl.
CPC ......... *G06N 20/00* (2019.01); *G05B 23/0243* (2013.01); *G07C 5/008* (2013.01)

(58) Field of Classification Search
CPC .... G06N 20/00; G06N 20/10; G05B 23/0243; G05B 23/0221; G05B 2219/45071; G07C 5/008
See application file for complete search history.

(56) References Cited

U.S. PATENT DOCUMENTS

| | | | | |
|---|---|---|---|---|
| 5,577,166 | A * | 11/1996 | Mizuno ................... | G06N 3/08 706/11 |
| 9,811,781 | B2 * | 11/2017 | Ariyoshi ................ | G06N 20/00 |
| 2006/0129395 | A1 * | 6/2006 | Thiesson ................ | G06F 18/00 704/240 |
| 2013/0185097 | A1 * | 7/2013 | Saria ...................... | G06Q 10/00 705/3 |
| 2015/0112900 | A1 * | 4/2015 | Ariyoshi ................ | G06N 20/00 706/46 |

FOREIGN PATENT DOCUMENTS

| | | |
|---|---|---|
| JP | 2002-180851 | 6/2002 |
| JP | 2010-092355 | 4/2010 |

* cited by examiner

*Primary Examiner* — Sizo B Vilakazi
(74) *Attorney, Agent, or Firm* — AMIN, TUROCY & WATSON, LLP

(57) ABSTRACT

In an information processing method of an embodiment, a computer is configured to divide observation data into training data and test data, select non-target data from the training data, select a parameter combination from a parameter set corresponding to the non-target data, classify the non-target data as clusters in a feature space of the parameter combination under clustering setting conditions, generate, for each of the clusters, a model trained to output target data included in the training data when the non-target data of the clusters is input, and reselect the parameter combination or change the clustering setting conditions such that a difference between the target data output from the model and the target data of the test data decreases.

15 Claims, 10 Drawing Sheets

FIG. 5
| TIME | ALT | T1 | EGT | N1 | N2 | CAS | P3 | ... |
|------|-----|-----|-----|-----|-----|-----|-----|-----|
| t1 | *** | *** | *** | *** | *** | *** | *** | ... |
| t2 | *** | *** | *** | *** | *** | *** | *** | ... |
| t3 | *** | *** | *** | *** | *** | *** | *** | ... |
| ... | ... | ... | ... | ... | ... | ... | ... | ... |
FIG. 6
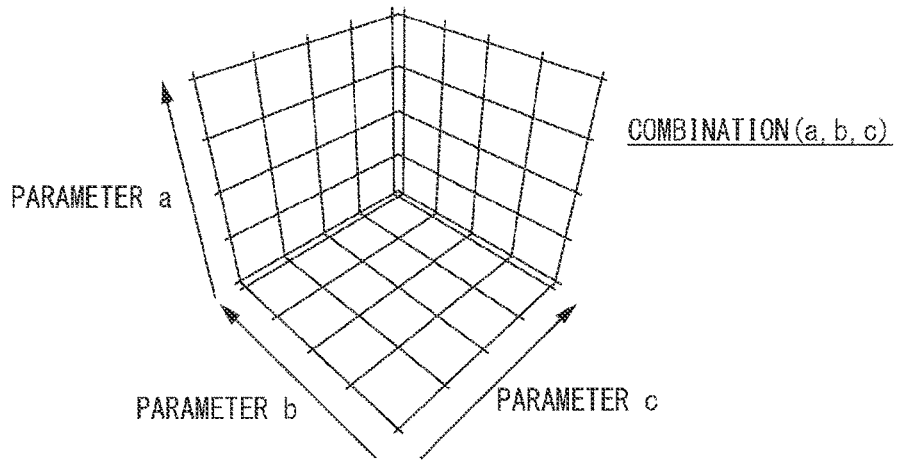
FIG. 7
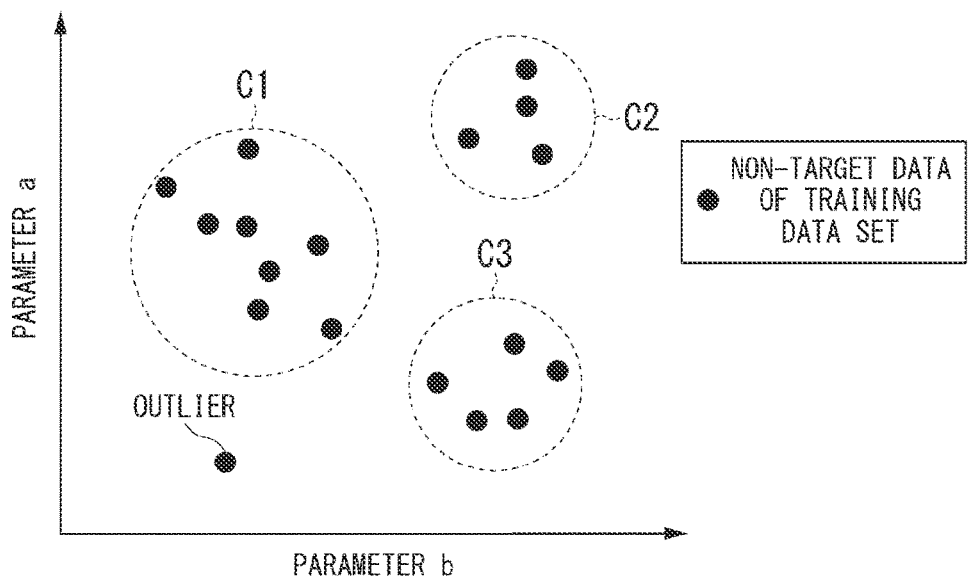

| NUMBER OF PROCESSES | PARAMETER COMBINATION | NUMBER OF CLUSTERS | ACCURACY (DIFFERENCE) OF PREDICTION MODEL | | | | | SCORE (ex. MEAN) |
|---|---|---|---|---|---|---|---|---|
| | | | MDL1 | MDL2 | MDL3 | MDL4 | ... | |
| 1 | (a, b, c) | 3 | 0.2 | 0.3 | 0.1 | - | ... | 0.2 |
| 2 | (a, b, d) | 4 | 0.2 | 0.4 | 0.2 | 0.5 | ... | 0.325 |
| ⋮ | ⋮ | ⋮ | ⋮ | ⋮ | ⋮ | ⋮ | ⋮ | ⋮ |
| k | (k, l, m) | 3 | 0.1 | 0.1 | 0.2 | - | ... | 0.133 |
| k+1 | (k, l, m, n, o) | 4 | 0.2 | 0.1 | 0.4 | 0.4 | ... | 0.275 |
| ⋮ | ⋮ | ⋮ | ⋮ | ⋮ | ⋮ | ⋮ | ⋮ | ⋮ |

INFORMATION PROCESSING METHOD, INFORMATION PROCESSING APPARATUS, AND ABNORMALITY DETERMINATION SYSTEM

CROSS-REFERENCE TO RELATED APPLICATION

This application is based upon and claims the benefit of priority from Japanese Patent Application No. 2020-042046, filed Mar. 11, 2020, the entire content of which is incorporated herein by reference.

BACKGROUND

Field of the Invention

The present invention relates to an information processing method, an information processing apparatus, and an abnormality determination system.

Description of Related Art

A method of learning a certain machine learning model using a training data set in which one side of first data and second data in a causal relationship is input data and the other side is output data is known. With respect to this, a technology for estimating or predicting target data from non-target data by learning in advance a machine learning model using a training data set in which the certain target data and the non-target data other than the target data included in flight data of an aircraft are output data and input data, respectively, and using the trained model is known (refer to Japanese Unexamined Patent Application, First Publication No. 2010-092355 or Japanese Unexamined Patent Application, First Publication No. 2002-180851, for example).

SUMMARY

However, in the conventional technology, there are cases in which estimation accuracy or prediction accuracy of target data according to the model is not insufficient.

One aspect of the present invention devised in view of such circumstances provides an information processing method, an information processing apparatus, and an abnormality determination system capable of improving estimation accuracy or prediction accuracy of target data according to a model.

An information processing method, an information processing apparatus, and an abnormality determination system according to the present invention employ the following configurations.

(1) A first aspect of the present invention is an information processing method, using a computer, including: dividing observation data into a training data set and a test data set; selecting a plurality of pieces of non-target data other than certain target data from a plurality of different types of data included in the training data set divided from the observation data; selecting a combination of at least three parameters from a parameter set corresponding to each type of the selected plurality of pieces of non-target data; classifying the non-target data in data densities equal to or greater than a threshold value as clusters and removing the non-target data in the data densities less than the threshold value in a feature space having the parameters of the selected combination as dimensions under certain clustering setting conditions; generating, for each of the clusters, a model trained to output the target data included in the training data set when the non-target data classified as the clusters is input using a non-linear regression method; inputting the plurality of pieces of non-target data included in the test data set divided from the observation data to the model generated for each cluster, comparing the target data output from the model to which the plurality of pieces of non-target data have been input with the target data included in the test data set, and evaluating the model on the basis of a result of comparison between the pieces of target data; and selecting a new combination of parameters from the parameter set or changing the clustering setting conditions such that a difference between the target data output from the model and the target data included in the test data set decreases.

(2) In a second aspect of the present invention, in the information processing method in the first aspect, the observation data is flight data of an aircraft equipped with a gas-turbine engine.

(3) In a third aspect of the present invention, in the information processing method in the first or second aspect, the computer is configured to preferentially select, from the plurality of pieces of non-target data included in the test data set, non-target data closer to the non-target data included in the training data set than other pieces of non-target data, and input the selected non-target data to the model.

(4) In a fourth aspect of the present invention, in the information processing method in any one of the first to third aspects, the computer is configured to select the new combination of parameters from the parameter set, classify the non-target data in the data densities equal to or greater than the threshold value as new clusters and removes the non-target data in the data densities less than the threshold value in a new feature space having the parameters of the newly selected combination as dimensions under the clustering setting conditions, generate, for each of the new clusters, a new model trained to output the target data included in the training data set when the non-target data classified as the new clusters is input, input the plurality of pieces of non-target data included in the test data set divided from the observation data to the model newly generated for each cluster, compare the target data output from the model to which the plurality of pieces of non-target data have been input with the target data included in the test data set, and evaluate the newly generated model on the basis of a result of comparison between the pieces of target data.

(5) In a fifth aspect of the present invention, in the information processing method in any one of the first to fourth aspects, the computer is configured to change the clustering setting conditions, classify the non-target data in the data densities equal to or greater than the threshold value as the new clusters and remove the non-target data in the data densities less than the threshold value in the feature space having the parameters of the selected combination as dimensions under the changed clustering setting conditions, generate, for each of the new clusters, the new model trained to output the target data included in the training data set when the non-target data classified as the new clusters is input, and input the plurality of pieces of non-target data included in the test data set divided from the observation data to the model newly generated for each cluster, compare the target data output from the model to which the plurality of pieces of non-target data have been input with the target data included in the test data set, and evaluate the newly generated model on the basis of a result of comparison between the pieces of target data.

(6) In a sixth aspect of the present invention, in the information processing method in any one of the first to fifth aspects, the computer is configured to newly select the parameter combination in which at least one parameter type is different compared to the previously selected parameter combination.

(7) In a seventh aspect of the present invention, in the information processing method in any one of the first to sixth aspects, the computer is configured to newly select the parameter combination in which a number of parameters is different compared to the previously selected parameter combination.

(8) In an eighth aspect of the present invention, in the information processing method in any one of the first to seventh aspects, the computer is configured to select the new parameter combination from the parameter set using an optimization method or changes the clustering setting conditions.

(9) In a ninth aspect of the present invention, in the information processing method in any one of the first to eighth aspects, the computer is configured to evaluate, as highest, a model for which a difference between the target data output from the model and the target data included in the test data set is smallest, among the plurality of generated models.

(10) A tenth aspect of the present invention is an information processing apparatus including: a divider which is configured to divide observation data into a training data set and a test data set; a first selector which is configured to select a plurality of pieces of non-target data other than certain target data from a plurality of different types of data included in the training data set divided from the observation data by the divider; a second selector which is configured to select a combination of at least three parameters from a parameter set corresponding to each type of the plurality of pieces of non-target data selected by the first selector; a classifier which is configured to classify the non-target data in data densities equal to or greater than a threshold value as clusters and remove the non-target data in the data densities less than the threshold value in a feature space having the parameters of the combination selected by the second selector as dimensions under certain clustering setting conditions; a generator which is configured to generate, for each of the clusters, a model trained to output the target data included in the training data set when the non-target data classified as the clusters by the classifier is input using a non-linear regression method; and an evaluator which is configured to input the plurality of pieces of non-target data included in the test data set divided from the observation data by the divider to the model generated by the generator for each cluster, compare the target data output from the model to which the plurality of pieces of non-target data have been input with the target data included in the test data set, and evaluate the model on the basis of a result of comparison between the pieces of target data, wherein the second selector is configured to select a new combination of parameters from the parameter set such that a difference between the target data output from the model and the target data included in the test data set decreases, or the classifier is configured to change the clustering setting conditions such that the difference between the target data output from the model and the target data included in the test data set decreases.

(11) In an eleventh aspect of the present invention, in the information processing apparatus in the tenth aspect, the observation data is flight data of an aircraft equipped with a gas-turbine engine.

(12) In a twelfth aspect of the present invention, in the information processing apparatus in the tenth or eleventh aspect, the evaluator is configured to preferably select, from the plurality of pieces of non-target data included in the test data set, non-target data closer to the non-target data included in the training data set than other pieces of non-target data, and inputs the selected non-target data to the model.

(13) A thirteenth aspect of the present invention is an abnormality determination system including the information processing apparatus of the eleventh aspect, and an abnormality determination apparatus, wherein the abnormality determination apparatus includes: an acquirer which is configured to acquire flight data of an operation target aircraft equipped with the gas-turbine engine; a third selector which is configured to select the plurality of pieces of non-target data from a plurality of different types of data included in the flight data acquired by the acquirer; and a determiner which is configured to input the plurality of pieces of non-target data selected by the third selector to the model generated by the generator and determine an abnormality in the operation target aircraft on the basis of an output result of the model to which the plurality of pieces of non-target data have been input.

(14) In a fourteenth aspect of the present invention, in the abnormality determination system in the thirteenth aspect, the determiner is configured to determine that an abnormality has occurred in the operation target aircraft when the target data output from the model to which the plurality of pieces of non-target data have been input is not consistent with the target data included in the flight data acquired by the acquirer.

(15) In a fifteenth aspect of the present invention, in the abnormality determination system in the thirteenth or fourteenth aspect, the abnormality determination apparatus further includes: a communicator which is configured to communicate with a terminal device usable by a technician who repairs the aircraft; and a communication controller which is configured to transmit a determination result of the determiner to the terminal device through the communicator.

(16) A sixteenth aspect of the present invention is an abnormality determination apparatus including: an acquirer which is configured to acquire flight data of an aircraft equipped with a gas-turbine engine; a selector which is configured to select a plurality of pieces of non-target data other than target data from a plurality of different types of data included in the flight data acquired by the acquirer; and a determiner which is configured to input the plurality of pieces of non-target data selected by the selector to a model trained to output the target data when the plurality of pieces of non-target data are input and determines an abnormality in the aircraft on the basis of an output result of the model to which the plurality of pieces of non-target data have been input.

(17) A seventeenth aspect of the present invention is an abnormality determination method, using a computer, including: acquiring flight data of an aircraft equipped with a gas-turbine engine; selecting a plurality of pieces of non-target data other than target data from a plurality of different types of data included in the acquired flight data; and inputting the selected plurality of pieces of non-target data to a model trained to output the target data when the plurality of pieces of non-target data are input and determining an abnormality in the aircraft on the basis of an output result of the model to which the plurality of pieces of non-target data have been input.

(18) An eighteenth aspect of the present invention is a computer-readable non-transitory storage medium storing a program for causing a computer to execute: dividing observation data into a training data set and a test data set; selecting a plurality of pieces of non-target data other than certain target data from a plurality of different types of data included in the training data set divided from the observation data; selecting a combination of at least three parameters from a parameter set corresponding to each type of the selected plurality of pieces of non-target data; classifying the non-target data in data densities equal to or greater than a threshold value as clusters and removing the non-target data in the data densities less than the threshold value in a feature space having the parameters of the selected combination as dimensions under certain clustering setting conditions; generating, for each of the clusters, a model trained to output the target data included in the training data set when the non-target data classified as the clusters is input using a non-linear regression method; inputting the plurality of pieces of non-target data included in the test data set divided from the observation data to the model generated for each cluster, comparing the target data output from the model to which the plurality of pieces of non-target data have been input with the target data included in the test data set, and evaluating the model on the basis of a result of comparison between the pieces of target data; and selecting a new combination of parameters from the parameter set or changing the clustering setting conditions such that a difference between the target data output from the model and the target data included in the test data set decreases.

(19) In a nineteenth aspect of the present invention, in the storage medium in the eighteenth aspect, the observation data is flight data of an aircraft equipped with a gas-turbine engine.

(20) A twentieth aspect of the present invention is a computer-readable non-transitory storage medium storing a program for causing a computer to execute: acquiring flight data of an aircraft equipped with a gas-turbine engine; selecting a plurality of pieces of non-target data other than target data from a plurality of different types of data included in the acquired flight data; and inputting the selected plurality of pieces of non-target data to a model trained to output the target data when the plurality of pieces of non-target data are input and determining an abnormality in the aircraft on the basis of an output result of the model to which the plurality of pieces of non-target data have been input.

According to any aspect of the aforementioned (1) to (20), it is possible to improve estimation accuracy or prediction accuracy of target data according to a model.

BRIEF DESCRIPTION OF THE DRAWINGS

FIG. 5 is a diagram illustrating an example of flight data.

FIG. 6 is a diagram illustrating an example of a feature space.

FIG. 7 is a diagram schematically illustrating a clustering result in the future space (a, b, c).

DESCRIPTION OF EMBODIMENTS

Hereinafter, embodiments of an information processing method, an information processing apparatus, and an abnormality determination system of the present invention will be described with reference to the drawings. As used throughout this disclosure, the singular forms "a," "an," and "the" include plural reference unless the context clearly dictates otherwise.

[Configuration of Abnormality Determination System]

Figure 1:
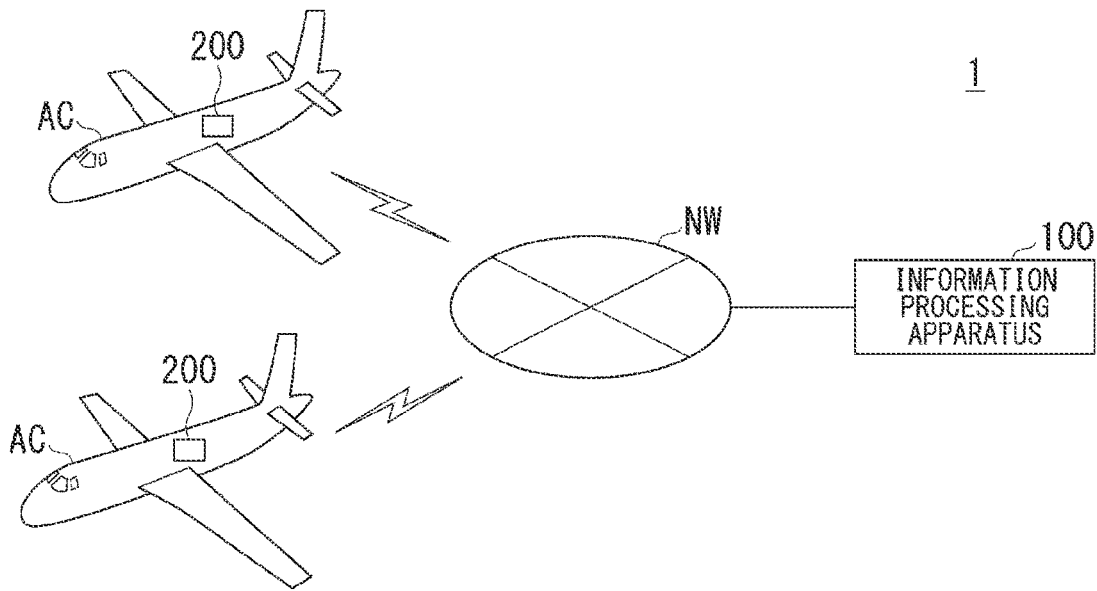
FIG. 1 is a diagram illustrating an example of a configuration of an abnormality determination system according to an embodiment.

FIG. 1 is a diagram illustrating an example of a configuration of an abnormality determination system 1 according to an embodiment. As illustrated, the abnormality determination system 1 may include, for example, an information processing apparatus 100 and an abnormality determination apparatus 200. The abnormality determination apparatus 200 is included in an aircraft AC equipped with a gas-turbine engine. For example, the aircraft AC may be equipped with a plurality of sensors for detecting the temperature and the pressure of the gas-turbine engine, the rotation speed of the turbine, and the like and generate flight data including detection values of the sensors. The information processing apparatus 100 and the abnormality determination apparatus 200 are connected to a network NW. The network NW may be, for example, a wide area network (WAN), a local area network (LAN), or the like.

[Configuration of Information Processing Apparatus]

Hereinafter, a configuration of the information processing apparatus 100 will be described. The information processing apparatus 100 may be a single apparatus or a system in which a plurality of apparatuses connected via the network NW operate in cooperation. That is, the information processing apparatus 100 may be implemented by a plurality of computers (processors) included in a distributed computing system or a cloud computing system.

Figure 2:
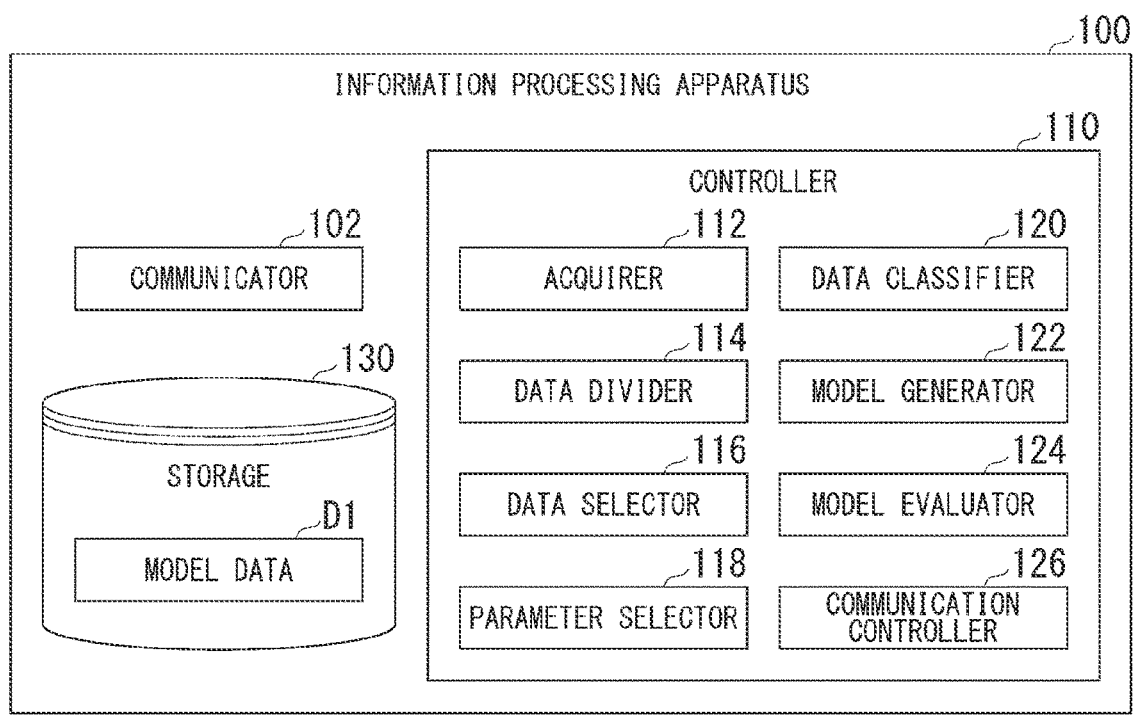
FIG. 2 is a diagram illustrating an example of a configuration of an information processing apparatus according to an embodiment.

FIG. 2 is a diagram illustrating an example of a configuration of the information processing apparatus 100 according to an embodiment. As illustrated, the information processing apparatus 100 may include, for example, a communicator 102, a controller 110, and a storage 130.

The communicator 102 may include, for example, a wireless communication module including a network interface card (NIC), a receiver, and a transmitter, and the like. The communicator 102 communicates with the abnormality determination apparatus 200, the aircraft AC equipped with the abnormality determination apparatus 200, and the like through the network NW.

The controller 110 may include, for example, an acquirer 112, a data divider 114, a data selector 116, a parameter selector 118, a data classifier 120, a model generator 122, a model evaluator 124, and a communication controller 126. The data selector 116 is an example of a "first selector" and the parameter selector 118 is an example of a "second selector."

The components of the controller 110 may be realized, for example, by a processor such as a central processing unit (CPU) or a graphics processing unit (GPU) executing a program stored in the storage 130. Some or all components of the controller 110 may be realized by hardware such as a large scale integration (LSI) circuit, an application specific integrated circuit (ASIC), or a field-programmable gate array (FPGA), or realized by software and hardware in cooperation.

The storage 130 may be realized, for example, by a hard disk drive (HDD), a flash memory, an electrically erasable programmable read only memory (EEPROM), a read only memory (ROM), a random access memory (RAM), and the like. The storage 130 stores various programs such as firmware and application programs. The storage 130 stores model data D1 and the like in addition to programs referred to by a processor. The model data D1 is information (a program or a data structure) which defines a prediction model MDL which will be described later.

[Processing Flow of Information Processing Apparatus]

Figure 3:
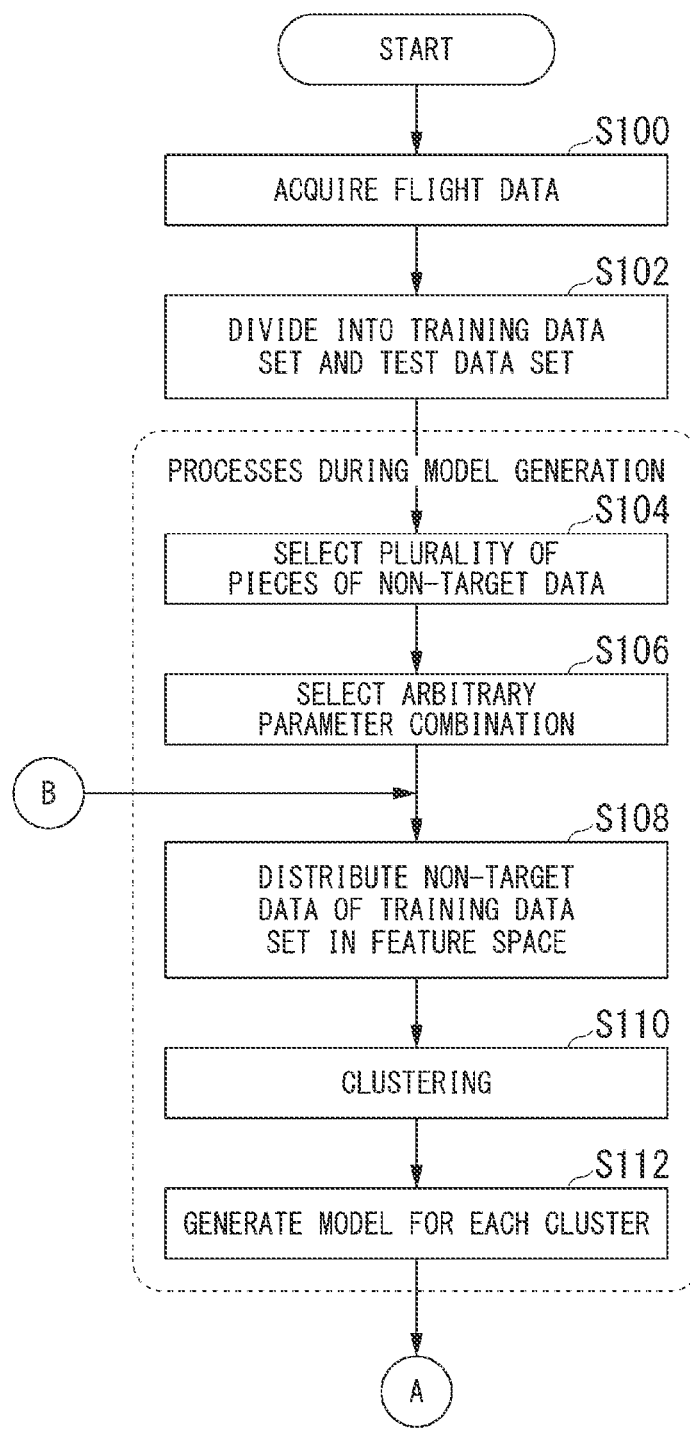
FIG. 3 is a flowchart illustrating an example of a flow of a series of processes of the information processing apparatus according to an embodiment (1).
Figure 4:
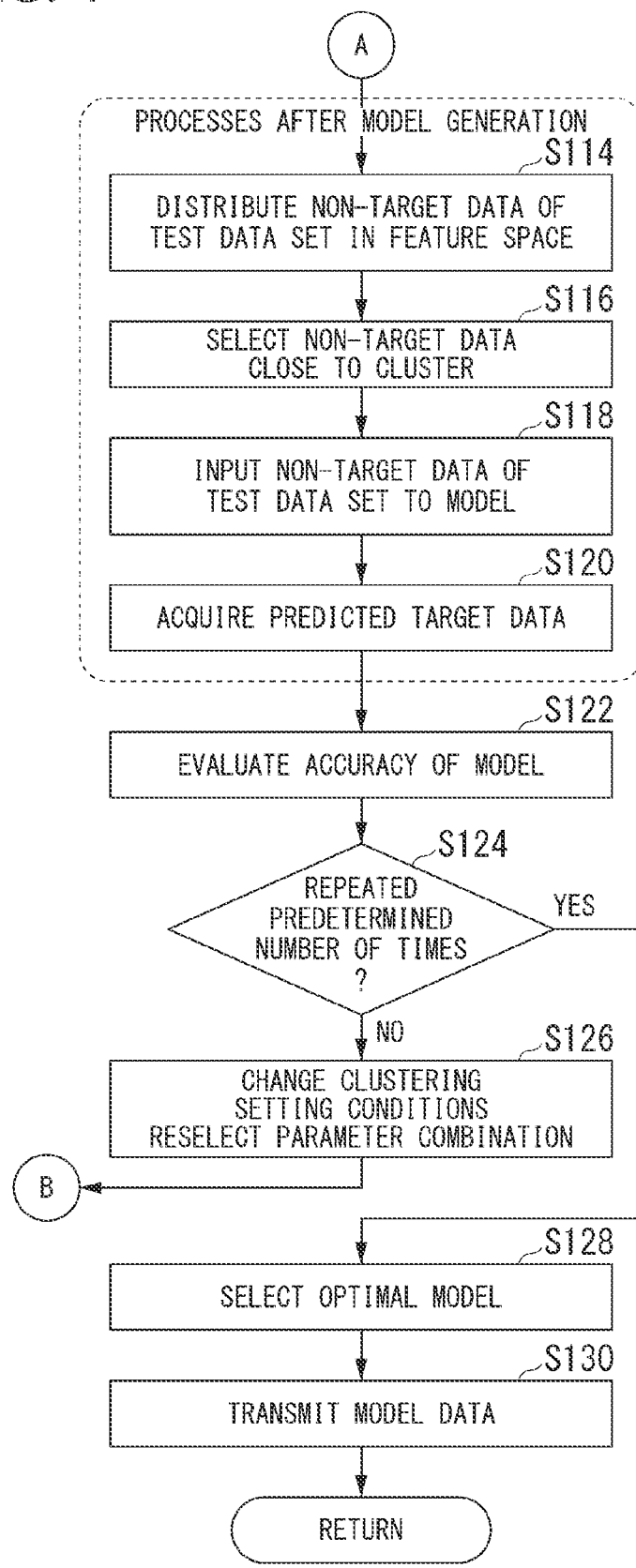
FIG. 4 is a flowchart illustrating an example of a flow of a series of processes of the information processing apparatus according to the embodiment (2).

Hereinafter, a flow of a series of processes of the information processing apparatus 100 will be described based on flowcharts. FIG. 3 and FIG. 4 are flowcharts illustrating an example of a flow of a series of processes of the information processing apparatus 100 according to an embodiment. Processes of the present flowcharts may be repeatedly performed at a predetermined interval such as 24 hours, one week, or one month, for example. In a case where the information processing apparatus 100 is implemented by a plurality of computers included in a distributed computing system or a cloud computing system, some or all processes of the present flowcharts may be processed in parallel by the plurality of computers.

First, the acquirer 112 acquires flight data from the aircraft AC equipped with a gas-turbine engine through the communicator 102 (step S100). It is assumed that the aircraft AC from which the flight data is acquired is an aircraft having no abnormality in the gas-turbine engine, the airframe, various sensors, and the like thereof. Specifically, the acquirer 112 acquires the flight data from the aircraft AC regarded as an aircraft on which maintenance, repairing or the like has been performed a very short period of about several days or several weeks ago and which is unlikely to have an abnormality occurring in the gas-turbine engine, the airframe, or the like thereof. The flight data of the aircraft AC equipped with the gas-turbine engine is an example of "observation data."

FIG. 5 is a diagram illustrating an example of flight data. As illustrated, flight data may be data in which data representing detection results of various sensors (hereinafter referred to detection data) is associated with time. For example, flight data may include a plurality of different types of detection data such as an altitude ALT of the aircraft AC, an entrance temperature T1 of the gas-turbine engine, an exhaust gas temperature EGT of the gas-turbine engine, a rotation speed N1 of a low pressure turbine provided in the gas-turbine engine, a rotation speed N2 of a high pressure turbine provided in the gas-turbine engine, a speed CAS of the aircraft AC, and an exit pressure P3 of a compressor provided in the gas-turbine engine. That is, the flight data may be multi-dimensional vector or tensor data.

Description will now return to the flowcharts of FIG. 3 and FIG. 4. Next, the data divider 114 divides the flight data acquired by the acquirer 112 into a training data set and a test data set (step S102).

Next, the data selector 116 selects a plurality of pieces of non-target data other than certain target data from a plurality of pieces of detection data included in the training data set divided from the flight data by the data divider 114 (step S104).

As illustrated in FIG. 5, in a case where seven types of detection data are included in the flight data that is a division source, the training data set also includes seven types of detection data. In this case, the data selector 116 sets a certain type of detection data as target data and selects the remaining six types of detection data as non-target data. For example, target data may be the exit pressure P3 of the compressor provided in the gas-turbine engine.

Next, the parameter selector 118 selects a combination of at least three parameters from a parameter set corresponding to each of the plurality of types of detection data (step S106). For example, in a case where the training data set includes the aforementioned seven types of detection data, a parameter set includes a total of seven types of parameters (scales or units) such as an altitude, a temperature, a rotation speed, and a speed. In a case where three parameters are selected from such a parameter set and combined, for example, the parameter selector 118 selects a single combination from a total of 35 combinations.

Next, the data classifier 120 distributes the plurality of pieces of non-target data in a feature space having, as dimensions, the plurality of parameters included in the parameter combination selected by the parameter selector 118 (step S108). Since the non-target data is a part of the training data set, distribution of the non-target data may be replaced with distribution of the training data set.

FIG. 6 is a diagram illustrating an example of a feature space. For example, it is assumed that the parameter selector 118 selects a combination of three parameters a, b, and c from a parameter set. In this case, a feature space becomes a three-dimensional space having the parameters a, b, and c as dimensions. In other words, the feature space becomes a space spread by three base vectors when the parameters a, b, and c are used as the base vectors. The feature space may be regarded as a subspace of a vector space corresponding to the training data set. In a case where four or more parameters are selected as a combination, a feature space becomes a space of four or more dimensions although it cannot be illustrated.

Description will now return to the flowcharts of FIG. 3 and FIG. 4. Next, the data classifier 120 performs clustering on the plurality of pieces of non-target data distributed in the feature space under certain determined clustering setting conditions (step S110). Since the non-target data is a part of the training data set, clustering on the non-target data may be replaced with clustering on the training data set.

For example, the data classifier 120 may regard the plurality of pieces of non-target data distributed in the feature space as a point set using the density-based spatial clustering of applications with noise (DBSCAN) clustering method, classify a plurality of points in a density equal to or greater than a threshold value as one cluster, and remove points in a density less than the threshold value as outliers (also referred to as noise values).

More specifically, the data classifier 120 focuses on any one point in the point set and classifies other points distributed within a certain radius c from the focused point as the same cluster. The radius c is one of the clustering setting conditions. The data classifier 120 repeats classification of points distributed within the radius c as the same cluster while changing focused points. The data classifier 120 excludes a focused point for which other points are not distributed within the radius £, that is, a focused point that is not classified as any cluster from the feature space, as an outlier.

FIG. 7 is a diagram schematically illustrating a clustering result in feature data (a, b, c). In the illustrated example, a total of three clusters C1, C2, and C3 are formed.

Figure 8:
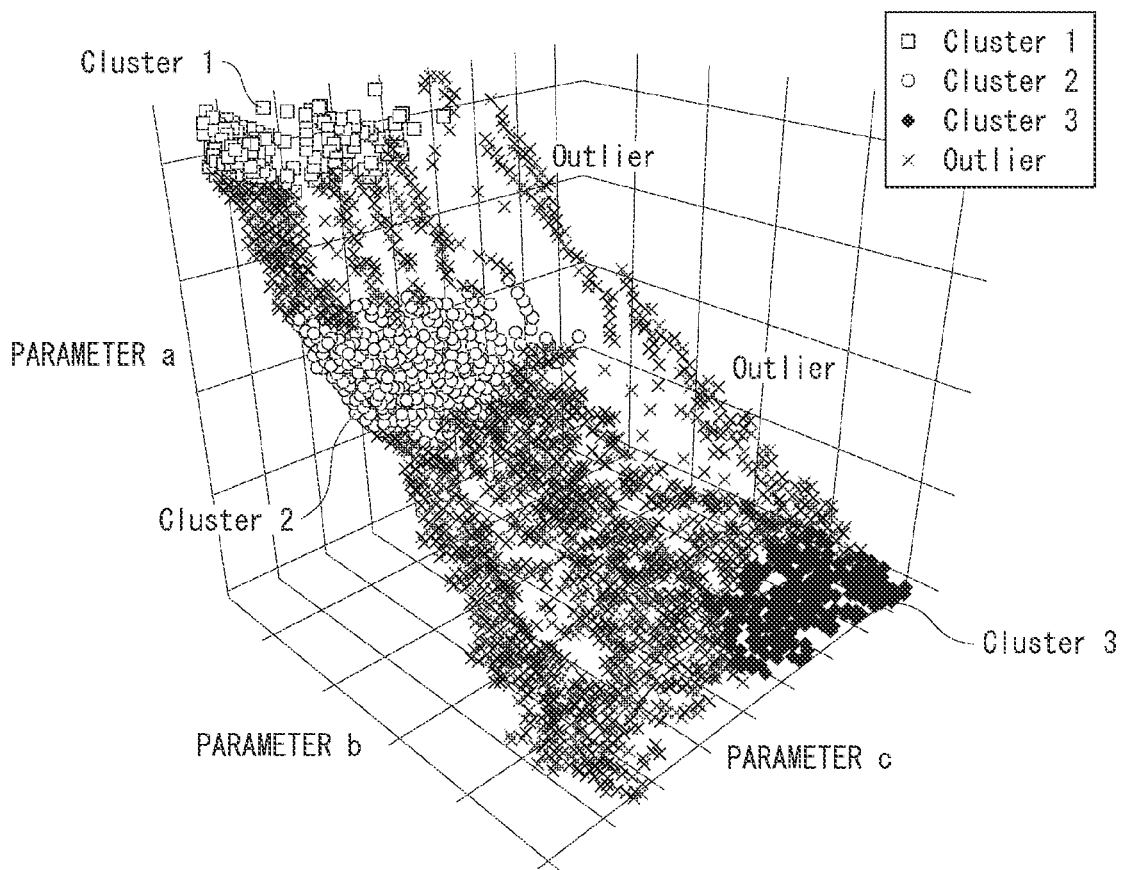
FIG. 8 is a diagram illustrating an example of a clustering result of a training data set obtained from actual flight data.

FIG. 8 is a diagram illustrating an example of a clustering result of a training data set obtained from actual flight data. In the illustrated example, three clusters are also formed in the feature space (a, b, c).

Description will now return to the flowcharts of FIG. 3 and FIG. 4. Next, the model generator 122 generates a certain regression model for each cluster formed by the data classifier 120 using a nonlinear regression method (step S112).

For example, when non-target data is input, the model generator 122 may learn a model such that target data associated with the non-target data through time in the training data set is output as a predicted value or an estimated value using support vector regression (SVR) that is a nonlinear regression method. For example, it is assumed that non-target data $Xt_1$ and target data $Yt_1$ are included in a certain piece of training data at a time ti. In this case, the model generator 122 learns a model such that the target data $Yt_1$ is output when the non-target data $Xt_1$ is input. This regression model is referred to as "prediction model MDL" in the following description.

Figure 9:
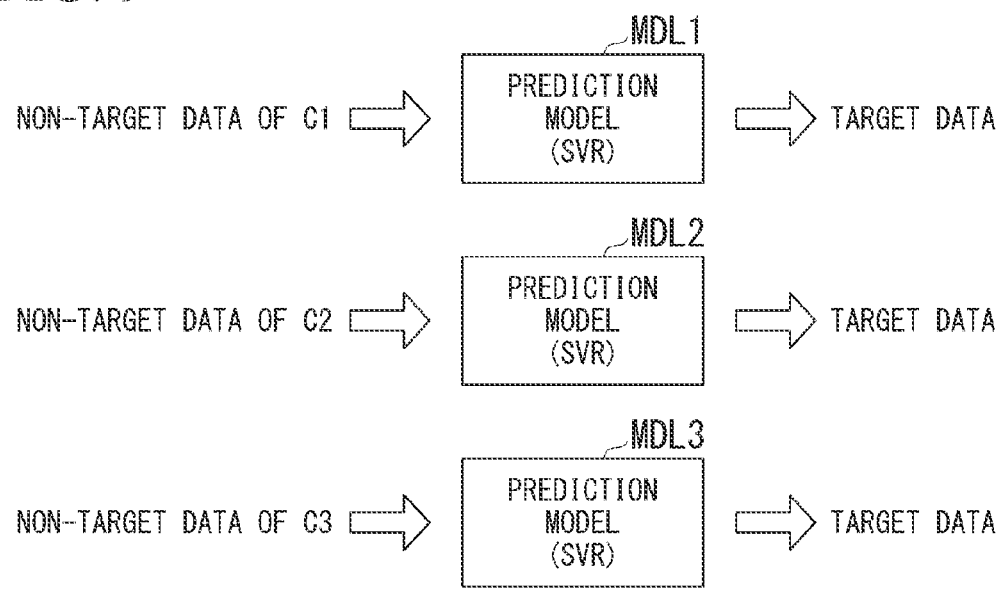
FIG. 9 is a diagram schematically illustrating a method of generating a prediction model for each cluster.

FIG. 9 is a diagram schematically illustrating a method of generating a prediction model MDL for each cluster. For example, it is assumed that three clusters C1, C2, and C3 are formed in the feature space. In this case, the model generator 122 generates a dedicated prediction model MDL1 for the cluster C1 using a plurality of pieces of non-target data classified as the cluster C1. Likewise, the model generator 122 generates a dedicated prediction model MDL2 for the cluster C2 using a plurality of pieces of non-target data classified as the cluster C2 and generates a dedicated prediction model MDL3 for the cluster C3 using a plurality of pieces of non-target data classified as the cluster C3. In this manner the prediction model MDL is generated for each cluster.

Description will now return to the flowcharts of FIG. 3 and FIG. 4. Next, the model evaluator 124 distributes a plurality of pieces of non-target data included in the test data set divided by the data divider 114 from the flight data in a feature space having the parameter combination selected by the parameter selector 118 in the process of S106 as dimensions (step S114).

Next, the model evaluator 124 preferentially selects non-target data close to each cluster from the plurality of pieces of non-target data distributed in the feature space (step S116). In other words, the model evaluator 124 preferentially selects non-target data close to non-target data included in a training data set classified as each cluster from the plurality of pieces of non-target data of the test data set distributed in the feature space.

Figure 10:
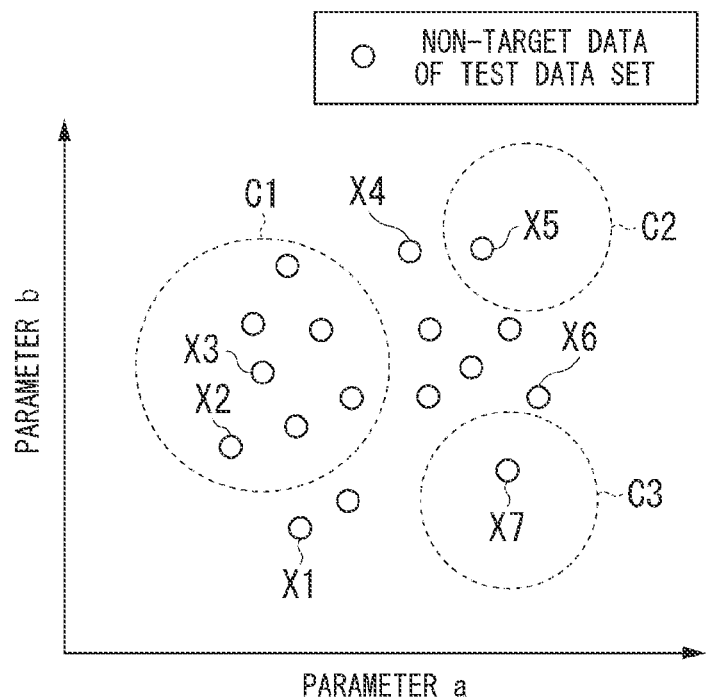
FIG. 10 is a diagram illustrating an example of a feature space in which non-target data of a test data set is distributed.

FIG. 10 is a diagram illustrating an example of a feature space in which non-target data of the test data set is distributed. For example, in a case where the cluster C1 formed using the non-target data of the training data set is focused on, non-target data X1 of the test data set is distributed outside the cluster C1 and non-target data X2 is distributed inside the cluster C1. In this case, the model evaluator 124 preferentially selects the non-target data X2 instead of the non-target data X1 as non-target data close to the cluster C1. "Non-target data close to the cluster C1" is non-target data of the test data set which is close to non-target data of the training data set classified as the cluster C1. Proximity between pieces of non-target data may be calculated as cosine similarity, for example. In the illustrated example, non-target data X3 is also distributed in addition to the non-target data X2 inside the cluster C1. In such a case, the model evaluator 124 preferentially selects the non-target data X3 closer to the center of the cluster C1 as non-target data close to the cluster C1.

The same applies to the clusters C2 and C3. For example, non-target data X4 of the test data set is distributed outside the cluster C2 and non-target data X5 is distributed inside the cluster C2. In this case, the model evaluator 124 preferentially selects the non-target data X5 instead of the non-target data X4 as non-target data close to the cluster C2. "Non-target data close to the cluster C2" is non-target data of the test data set which is close to non-target data of the training data set classified as the cluster C2.

Non-target data X6 of the test data set is distributed outside the cluster C3 and non-target data X7 is distributed inside the cluster C3. In this case, the model evaluator 124 preferentially selects the non-target data X7 instead of the non-target data X6 as non-target data close to the cluster C3. "Non-target data close to the cluster C3" is non-target data of the test data set which is close to non-target data of the training data set classified as the cluster C3.

Description will now return to the flowcharts of FIG. 3 and FIG. 4. Next, the model evaluator 124 inputs the non-target data preferentially selected in the process of S116 to the prediction model MDL of each cluster (step S118). In the example of FIG. 10, the model evaluator 124 inputs the non-target data X3 to the prediction model MDL1 generated for the cluster C1, inputs the non-target data X5 to the prediction model MDL2 generated for the cluster C2, and inputs the non-target data X7 to the prediction model MDL3 generated for the cluster C3.

Next, the model evaluator 124 acquires target data (hereinafter referred to as predicted target data) that is a predicted value or an estimated value from each prediction model MDL to which the non-target data has been input (step S120).

Next, the model evaluator 124 compares target data associated with non-target data through time in the test data set with predicted target data output from the prediction models MDL and evaluates the accuracy of the prediction models MDL on the basis of a comparison result of the target data (step S122). For example, the model evaluator 124 may calculate a difference between target data included in the test data set and predicted target data output from a prediction model MDL and evaluate that the accuracy of the prediction model MDL is higher when the difference is smaller.

Next, the model evaluator 124 determines whether the process (=S122) of evaluating the accuracy of the prediction models MDL has been repeated a predetermined number of times (step S124).

In a case where the model evaluator 124 determines that the accuracy evaluation process is not repeated the predetermined number of times in the process of S124, the data classifier 120 changes the clustering setting conditions using an optimization method (step S126).

The optimization method may be, for example, a combinatorial optimization method represented by the genetic algorithm. The optimization method may be another combinatorial optimization method such as evolution strategy, local search, or the nearest neighbor algorithm instead of or in addition to the genetic algorithm.

For example, the data classifier 120 may change the radius c of DBSCAN as the clustering setting conditions.

When the clustering setting conditions have been changed, the data classifier 120 distributes a plurality of pieces of non-target data in the feature space (the same feature space as the previous one) based on the parameter combination selected in the process of S106. Then, the data classifier 120 performs clustering on the plurality of pieces of non-target data distributed in the feature space under the changed clustering setting conditions. As a result, clusters different from previous ones may be formed in the feature space because the clustering setting conditions are different from the previous ones although the feature space is the same as the previous one.

In a case where the model evaluator 124 determines that the accuracy evaluation process is not repeated the predetermined number of times in the process of S124, the parameter selector 118 may reselect a parameter combination using an optimization method instead of or in addition to the operation of the data classifier 120 to change the clustering setting conditions.

For example, the parameter selector 118 may reselect, from the parameter set, a combination in which at least one parameter type is different from the parameter combination selected in the process of S106. For example, when the parameter combination selected in the process of S106 is (a, b, c), the parameter selector 118 may reselect a combination in which at least any one of the parameters a, b, and c has been substituted with another parameter, such as (d, b, c), (a, d, c), or (a, b, d). Further, the parameter selector 118 may reselect a combination including a different number of parameters from the number of parameters included in the parameter combination selected in the process of S106. For example, when the parameter combination selected in the process of S106 is (a, b, c), the parameter selector 118 may increase the number of combined parameters, such as (a, b, c, d), (a, b, c, d, e), or (a, b, c, d, e, f).

In a case where the parameter selector 118 reselects a parameter combination, the data classifier 120 distributes a plurality of pieces of non-target data in a new feature space based on the reselected parameter combination. Then, the data classifier 120 performs clustering on the plurality of pieces of non-target data distributed in the new feature space under the same clustering setting conditions as the previous ones.

Figure 11:
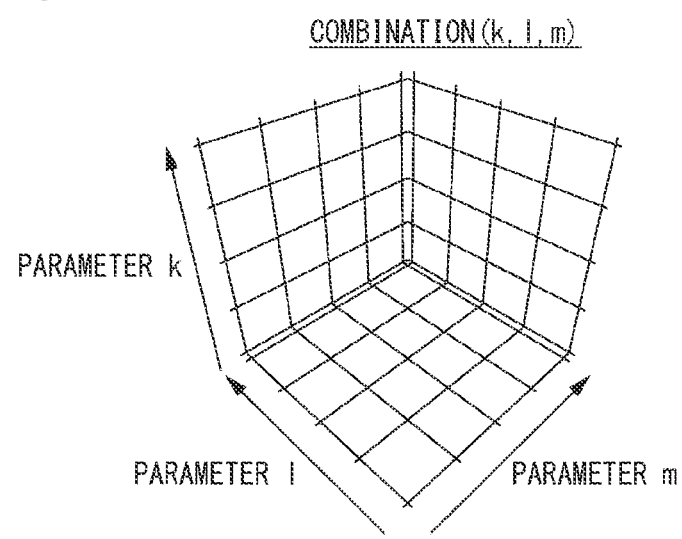
FIG. 11 is a diagram illustrating an example of a new feature space.

FIG. 11 is a diagram illustrating an example of a new feature space. The feature space illustrated in FIG. 11 is a three-dimensional space having parameters k, l, and m as dimensions. For example, it is assumed that the previously selected parameter combination is the parameter combination (a, b, c) illustrated in FIG. 6. In this case, clusters different from the previous ones may be formed in the feature space because the feature space is different from the previous one although the clustering setting conditions are the same as the previous ones.

Figure 12:
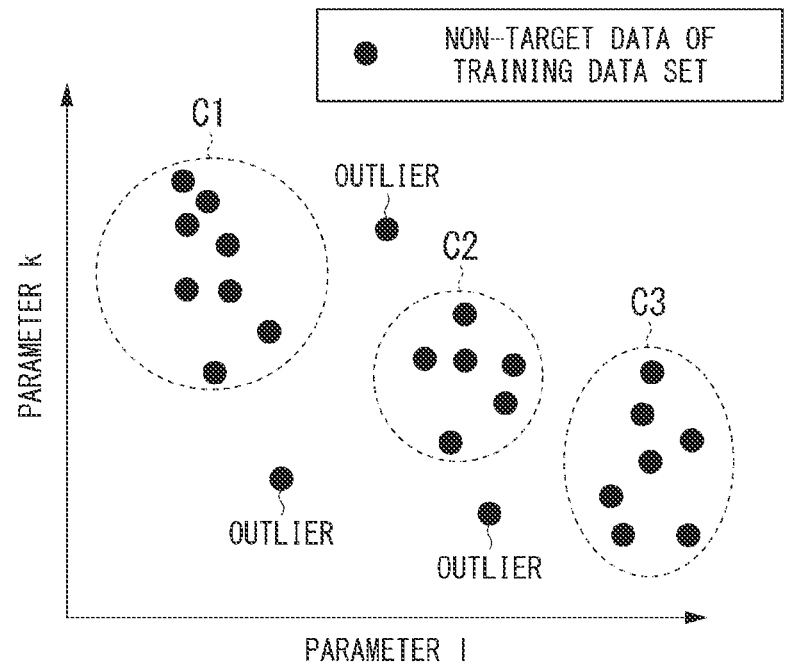
FIG. 12 is a diagram schematically illustrating a clustering result in the new feature space (k, l, m).

FIG. 12 is a diagram schematically illustrating a clustering result in the new feature space (k, l, m). In the example of FIG. 12, different clusters from the clusters illustrated in FIG. 7 are formed.

Figure 13:
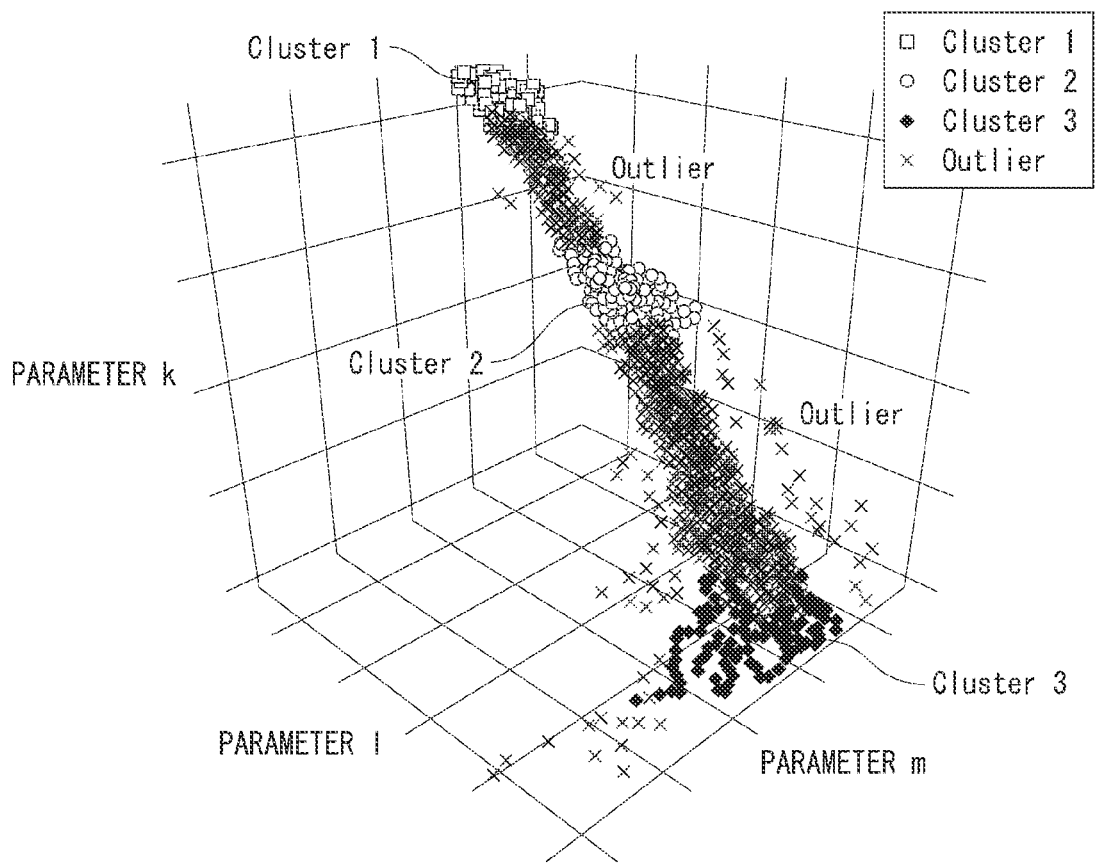
FIG. 13 is a diagram illustrating an example of a clustering result of a training data set obtained from actual flight data.

FIG. 13 is a diagram illustrating an example of a clustering result of a training data set obtained from actual flight data. In the illustrated example, the feature space (k, l, m) is newly formed and different clusters are formed although the non-target data (the same training data set) distributed in the feature space is the same as the previous one.

When clusters are newly formed in this manner, the model generator 122 regenerates a prediction model MDL for each newly formed cluster using a nonlinear regression method. Then, the model evaluator 124 repeats the processes of S114 to S124 upon generation of new prediction models MDL. That is, the model evaluator 124 inputs the plurality of pieces of non-target data included in the test data set to the prediction model MDL newly generated for each cluster, compares predicted target data output from the new prediction model MDL with target data included in the test data set, and evaluates the newly generated prediction model MDL on the basis of a result of comparison between the pieces of target data.

In a case where it is determined that the accuracy evaluation process is repeated the predetermined number of times in the process of S124, the model evaluator 124 selects an optimal model from a plurality of prediction models MDL that have been repeatedly evaluated the predetermined number of times (step S128).

Figures 14, 15:
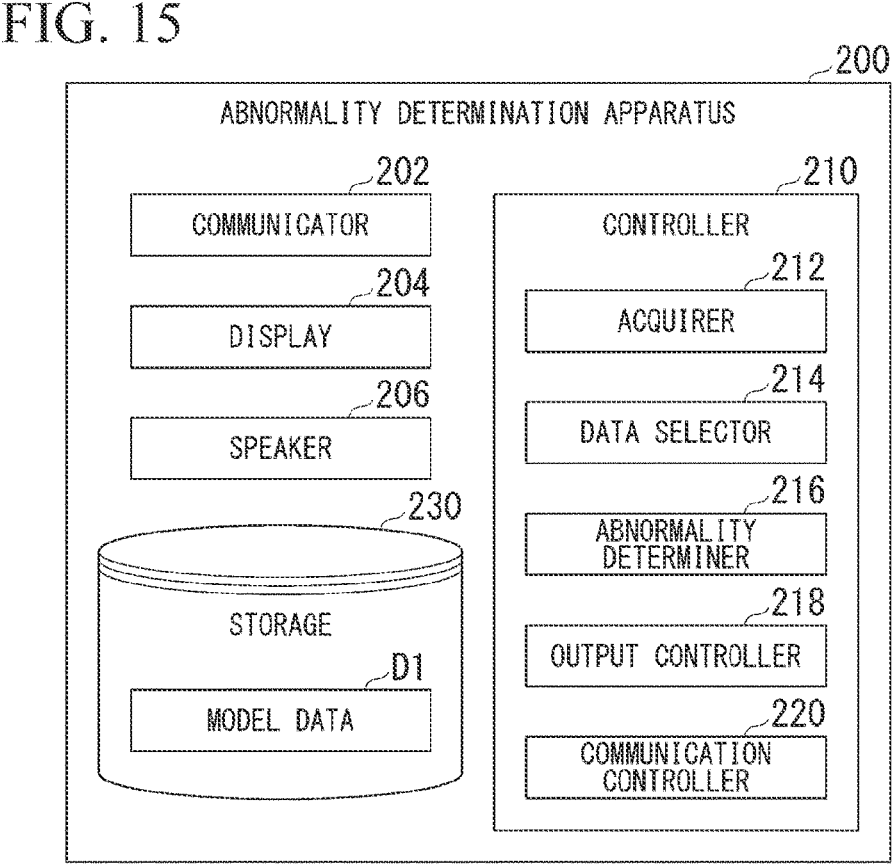
FIG. 14 is a diagram for describing a method of selecting an optimal model.
FIG. 15 is a diagram illustrating an example of a configuration of an abnormality determination apparatus according to an embodiment.

FIG. 14 is a diagram for describing a method of selecting an optimal model. For example, the model evaluator 124 may cause the storage 130 to store data in which a selected parameter combination, the number of clusters formed in a feature space, a prediction model MDL corresponding to each cluster, an evaluation result (e.g., a differential value) of each prediction model MDL, and a statistics score for evaluation results are associated for each accuracy evaluation process in a process of repeating the accuracy evaluation process. For example, three clusters may be formed and three prediction models MDL1, MDL2, and MDL3 may be generated in the first process. In this case, a score using differential values of the three prediction models MDL1, MDL2, and MDL3 is calculated. The score may be an arithmetic mean or a weighted mean, for example. Four clusters may be formed and four prediction models MDL1, MDL2, MDL3, and MDL4 may be generated in the second process. In this case, a score using differential values of the four prediction models MDL1, MDL2, MDL3, and MDL4 is calculated.

The model evaluator 124 compares such scores and selects a prediction model MDL having a lowest score as an optimal model. In the illustrated example, a combination of the three prediction models MDL1, MDL2, and MDL3 generated in a k-th process has a lowest score. In this case, the model evaluator 124 selects, as an optimal model, the combination of the three prediction models MDL1, MDL2, and MDL3 generated when a parameter combination (k, l, m) has been selected.

Next, when the optimal model is selected by the model evaluator 124, the communication controller 126 transmits model data D1 defining the optimal model to the abnormality determination apparatus 200 mounted in the aircraft AC through the communicator 102 (step S130). For example, in a case where the prediction model MDL is support vector regression, the communication controller 126 may transmit, as the model data D1, information such as a regression coefficient, a slack variable, and kernels. With this, processing of the present flowcharts ends.

[Configuration of Abnormality Determination Apparatus]

Hereinafter, a configuration of the abnormality determination apparatus 200 will be described. FIG. 15 is a diagram illustrating an example of a configuration of the abnormality determination apparatus 200 according to an embodiment. As illustrated, the abnormality determination apparatus 200 may include, for example, a communicator 202, a display 204, a speaker 206, a controller 210, and a storage 230.

The communicator 202 may include, for example, a wireless communication module including an NIC, a receiver, and a transmitter, and the like. The communicator 202 communicates with the information processing apparatus 100 and the like through a network NW.

The display 204 is a user interface that displays various types of information. For example, the display 204 may display an image generated by the controller 210. The display 204 may display a graphical user interface (GUI) for receiving various input operations from a user (e.g., a pilot or the like). For example, the display 104 may be a liquid crystal display (LCD), an organic electroluminescence (EL) display, or the like. For example, the display 204 may be provided in a cockpit of the aircraft AC, and the like.

The speaker 206 is a user interface that outputs sound. For example, the speaker 206 may receive an instruction from the controller 210 and output sound. For example, the speaker 206 may be provided in the cockpit of the aircraft AC, and the like.

The controller 210 may include, for example, an acquirer 212, a data selector 214, an abnormality determiner 216, an output controller 218, and a communication controller 220. The data selector 214 is an example of a "third selector."

The components of the controller 210 may be realized, for example, by a processor such as a CPU or a GPU executing a program stored in the storage 230. Some or all components of the controller 210 may be realized by hardware such as an LSI circuit, an ASIC, or an FPGA or realized by software and hardware in cooperation.

The storage 230 may be realized, for example, by an HDD, a flash memory, an EEPROM, a ROM, RAM, and the like. The storage 230 stores various programs such as firmware and application programs. The storage 230 stores model data D1 and the like in addition to programs referred to by a processor. The model data D1 may be installed in the storage 230 from the information processing apparatus 100 through the network NW, for example. In a case where a portable storage medium in which the model data D1 is stored is connected to a drive device of the abnormality determination apparatus 200, the model data D1 may be installed in the storage 230 from the portable storage medium.

[Processing Flow of Abnormality Processing Apparatus]

Figure 16:
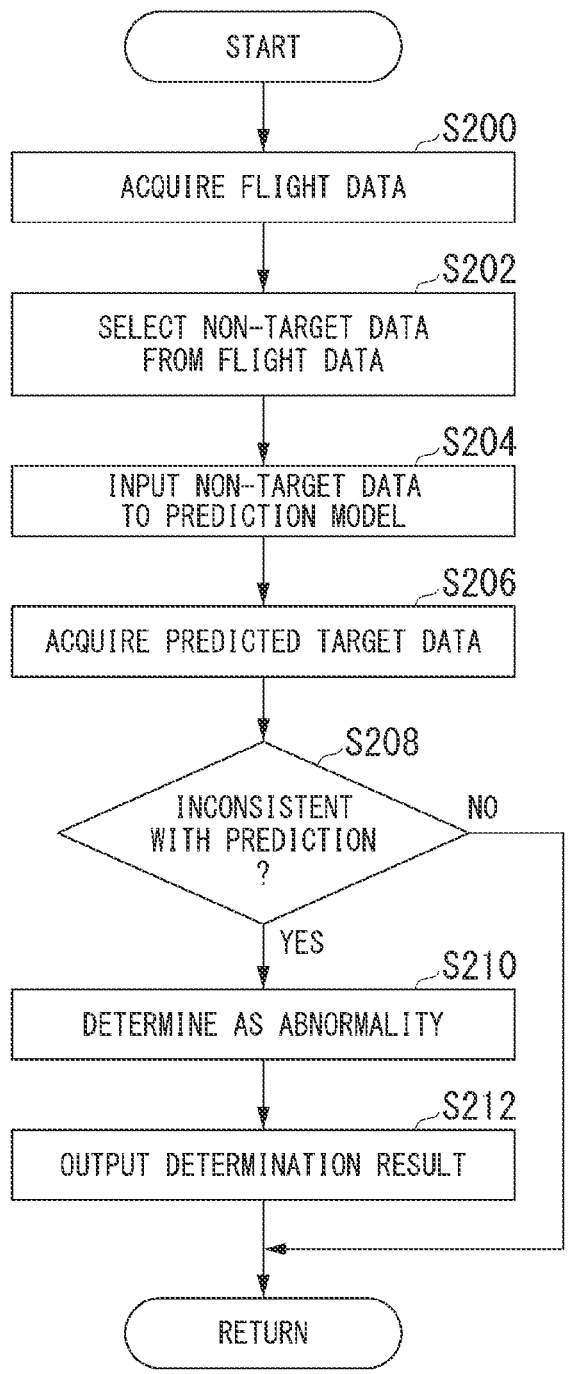
FIG. 16 is a flowchart illustrating an example of a flow of a series of processes of the abnormality determination apparatus according to an embodiment.

Hereinafter, a flow of a series of processes of the abnormality determination apparatus 200 will be described based on a flowchart. FIG. 16 is a flowchart illustrating an example of a flow of a series of processes of the abnormality determination apparatus 200 according to an embodiment. Processes of the present flowchart may be repeatedly performed at predetermined intervals, for example. In the following description, the aircraft AC equipped with the abnormality determination apparatus 200, that is, a host airplane, is referred to as an "operation target aircraft AC."

First, the acquirer 212 acquires flight data from the operation target aircraft AC (step S200). For example, the acquirer 212 may acquire detection data from a plurality of sensors attached to a gas-turbine engine and the like of the operation target aircraft AC and regard the plurality of pieces of detection data as flight data. It is assumed that this flight data includes the aforementioned target data and non-target data.

Next, the data selector 214 selects a plurality of pieces of non-target data from the plurality of pieces of detection data included in the flight data acquired by the acquirer 212 (step S202).

Here, the data selector 214 preferentially selects non-target data close to a cluster corresponding to each prediction model MDL defined by model data D1. For example, in a case where a combination of three prediction models MDL1, MDL2, and MDL3 generated when a parameter combination (k, l, m) is selected is selected as optimal models, model data D1 is data defining the prediction models MDL1, MDL2, and MDL3.

In this case, the data selector 214 distributes the plurality of pieces of non-target data included in the flight data acquired by the acquirer 212 in a feature space (k, l, m). Then, the data selector 214 preferentially selects, from the plurality of pieces of non-target data distributed in the feature space (k, l, m), non-target data distributed close to a cluster C1 corresponding to the prediction model MDL1, non-target data distributed close to a cluster C2 corresponding to the prediction model MDL2, and non-target data distributed close to a cluster C3 corresponding to the prediction model MDL3. As described above, non-target data of the flight data which is close to a cluster is non-target data of the flight data which is close to non-target data of a training data set classified as the cluster. In this manner, the data selector 214 selects non-target data through the same method as that used when the information processing apparatus 100 evaluates prediction models MDL.

Next, the abnormality determiner 216 inputs the non-target data selected by the data selector 214 to each prediction model MDL defined by the model data D1 (step S204). For example, it is assumed that the three prediction models MDL1, MDL2, and MDL3 are optimal models defined by the model data D1. In this case, the abnormality determiner 216 inputs the non-target data distributed close to the cluster C1 corresponding to the prediction model MDL1 to the prediction model MDL1, inputs the non-target data distributed close to the cluster C2 corresponding to the prediction model MDL2 to the prediction model MDL2, and inputs the non-target data distributed close to the cluster C3 corresponding to the prediction model MDL3 to the prediction model MDL3.

Next, the abnormality determiner 216 acquires predicted target data from each prediction model MDL (step S206). Then, the abnormality determiner 216 compares predicted target data output from each prediction model MDL with target data (target data detected by sensors) associated with non-target data through time in the flight data and determines whether the pieces of target data are consistent with each other (step S208).

For example, the abnormality determiner 216 may calculate a difference between the target data and the predicted target data for each prediction model MDL, determine that the pieces of target data are consistent with each other if the difference is within a permissible range and determine that the pieces of target data are not consistent with each other if the difference does not fall within the permissible range.

The abnormality determiner 216 ends processing of the present flowchart when the pieces of target data are consistent with each other.

On the other hand, the abnormality determiner 216 determines that an abnormality has occurred in the operation target aircraft AC when the pieces of target data are not consistent with each other (step S210). The "abnormality" may be, for example, at least one of various abnormalities such as abnormalities in sensors that detect target data, a failure in the gas-turbine engine, and an abnormality in a communication line that connects a sensor and the abnormality determination apparatus 200.

Next, the output controller 218 causes the display 204 to display, as an image, information representing that an abnormality has occurred in the operation target aircraft AC (hereinafter referred to as abnormality report information) or causes the speaker 206 to output the information as sound (step S212). Further, the communication controller 220 may transmit the abnormality report information to a terminal device that can be used by a technician who determines whether the operation target aircraft AC needs to be repaired through the communicator 202. With this, processing of the present flowchart ends.

According to the above-described embodiment, the information processing apparatus 100 divides flight data (an example of observation data) of the aircraft AC equipped with a gas-turbine engine into a training data set and a test data set. The information processing apparatus 100 selects a plurality of pieces of non-target data other than certain target data from a plurality of different types of detection data included in the training data set divided from the flight data. The information processing apparatus 100 selects a combination of at least three parameters from a parameter set corresponding to each type of the selected plurality of pieces of non-target data. The information processing apparatus 100 performs clustering in a feature space based on the parameter combination under certain clustering setting conditions, classifies non-target data in data densities equal to or greater than a threshold value as a cluster, and removes non-target data in data densities less than the threshold value. The information processing apparatus 100 generates, for each cluster, a prediction model MDL trained to output target data included in the training data set when a plurality of pieces of non-target data classified as a cluster are input using a non-linear regression method represented by support vector regression. The information processing apparatus 100 inputs a plurality of pieces of non-target data included in the test data set divided from the flight data to the prediction model MDL generated for each cluster, compares predicted target data output from the prediction model MDL with target data included in the test data set, and evaluates the prediction model MDL on the basis of a result of comparison between the pieces of target data. The information processing apparatus 100 selects a new combination of parameters from parameter sets or changes the clustering setting conditions such that a difference between the predicted target data output from the prediction model MDL and the target data included in the test data set decreases. Accordingly, it is possible to improve estimation accuracy or prediction accuracy of target data according to the prediction model MDL.

Although the information processing apparatus 100 divides the flight data of the aircraft AC equipped with the gas-turbine engine into the training data set and the test data set and generates or evaluates a prediction model MDL using the training data set and the test data set in the above-described embodiment, the present invention is not limited thereto. For example, the information processing apparatus 100 may divide various types of data collected during an automated operation or a manual operation of a vehicle or various types of data collected when an industrial machine, an industrial robot, or the like operates instead of or in addition to the flight data of the aircraft AC into a training data set and a test data set and generate or evaluate a prediction model MDL using the training data set and the test data set. Various types of data collected during an automated operation or a manual operation of a vehicle or various types of data collected when an industrial machine, an industrial robot, or the like operates are other examples of "observation data."

[Hardware Configuration]

Figure 17:
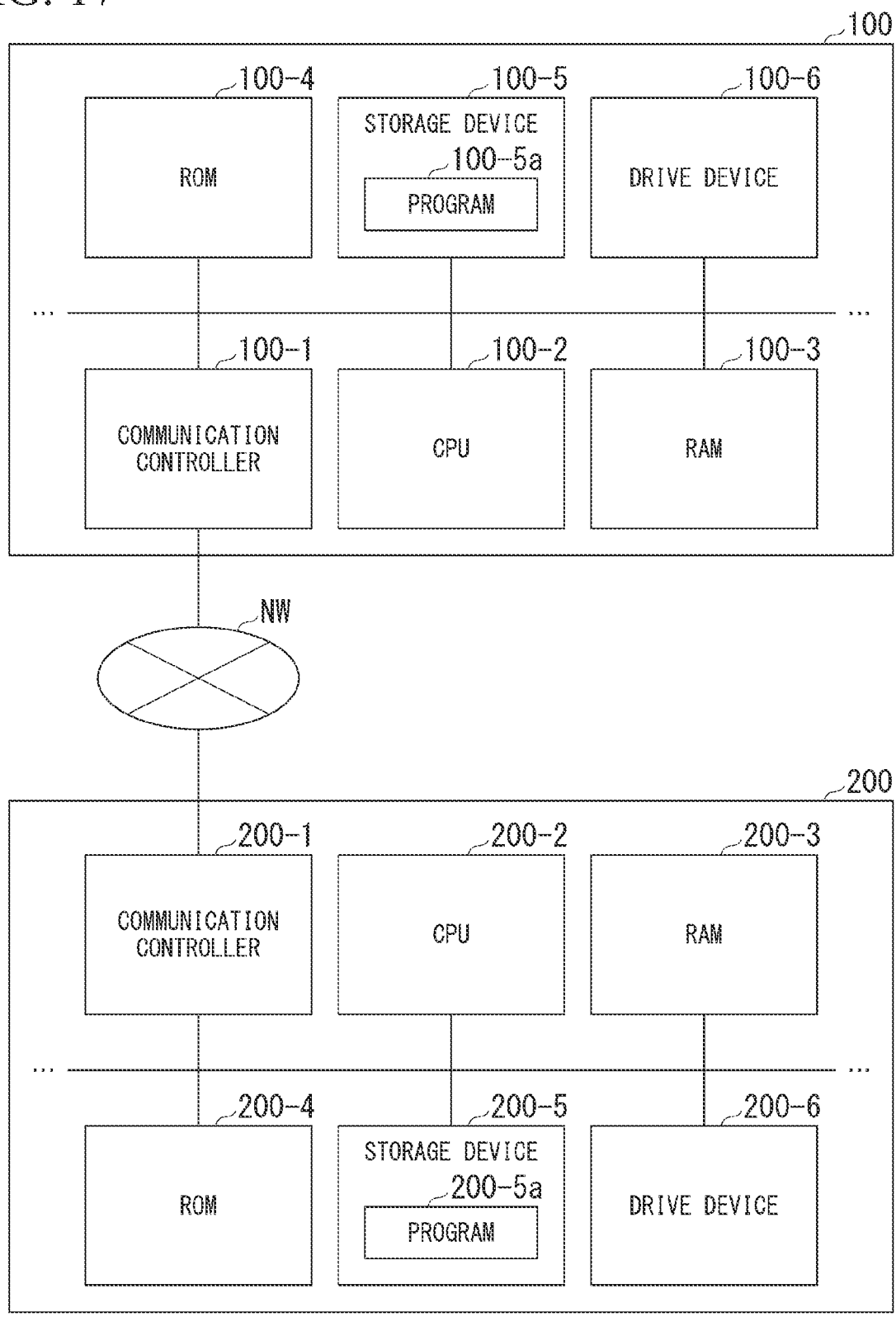
FIG. 17 is a diagram illustrating an example of a hardware configuration of the information processing apparatus and the abnormality determination apparatus of the embodiment.

FIG. 17 is a diagram illustrating an example of a hardware configuration of the information processing apparatus 100 and the abnormality determination apparatus 200 of the embodiment. As illustrated, the information processing apparatus 100 has a configuration in which a communication controller 100-1, a CPU 100-2, a RAM 100-3 used as a working memory, a ROM 100-4 in which a boot program and the like are stored, a storage device 100-5 such as a flash memory and an HDD, a drive device 100-6, and the like are connected through an internal bus or a dedicated communication line. The communication controller 100-1 communicates with the abnormality determination apparatus 200 and the like through a network NW. The storage device 100-5 stores a program 100-5a executed by the CPU 100-2. This program is developed in the RAM 100-3 according to a direct memory access (DMA) controller (not illustrated) or the like and executed by the CPU 100-2. Accordingly, some or all components of the controller 110 are realized.

The abnormality determination apparatus 200 has a configuration in which a communication controller 200-1, a CPU 200-2, a RAM 200-3 used as a working memory, a ROM 200-4 in which a boot program and the like are stored, a storage device 200-5 such as a flash memory and an HDD, a drive device 200-6, and the like are connected through an internal bus or a dedicated communication line. The communication controller 200-1 communicates with the information processing apparatus 100 and the like through a network NW. The storage device 200-5 stores a program 200-5a executed by the CPU 200-2. This program is developed in the RAM 200-3 according to a DMA controller (not illustrated) or the like and executed by the CPU 200-2. Accordingly, some or all components of the controller 210 are realized.

The above-described embodiment can be represented as follows.

(1) An information processing apparatus including:
at least one memory storing a program; and
at least one processor,
wherein the processor is configured, by executing the program;
to divide flight data of an aircraft equipped with a gas-turbine engine into a training data set and a test data set;

to select a plurality of pieces of non-target data included in the training data set divided from the flight data and other than certain target data in a plurality of different types of data;

to select a combination of at least three parameters from a parameter set corresponding to each type of the selected plurality of pieces of non-target data;

to classify the non-target data in data densities equal to or greater than a threshold value as clusters and to remove the non-target data in the data densities less than the threshold value in a feature space having the parameters of the selected combination as dimensions under certain clustering setting conditions;

to generate, for each of the clusters, a model trained to output the target data included in the training data set when the non-target data classified as the clusters is input using a non-linear regression method;

to input the plurality of pieces of non-target data included in the test data set divided from the flight data to the model generated for each cluster, to compare the target data output from the model to which the plurality of pieces of non-target data have been input with the target data included in the test data set, and to evaluate the model on the basis of a result of comparison between the pieces of target data; and to select a new combination of the parameters from the parameter set or change the clustering setting conditions such that a difference between the target data output from the model and the target data included in the test data set decreases.

(2) An abnormality determination apparatus including:

an acquirer which is configured to acquire flight data of an aircraft equipped with a gas-turbine engine;

a selector which is configured to select a plurality of pieces of non-target data other than target data from a plurality of different types of data included in the flight data acquired by the acquirer; and a determiner which is configured to input the plurality of pieces of non-target data selected by the selector to a model trained to output the target data when the plurality of pieces of non-target data are input and determine an abnormality in the aircraft on the basis of an output result of the model to which the plurality of pieces of non-target data have been input.

(3) An abnormality determination method, using a computer, including:

acquiring flight data of an aircraft equipped with a gas-turbine engine;

selecting a plurality of pieces of non-target data other than target data from a plurality of different types of data included in the acquired flight data; and inputting the selected plurality of pieces of non-target data to a model trained to output the target data when the plurality of pieces of non-target data are input and determining an abnormality in the aircraft on the basis of an output result of the model to which the plurality of pieces of non-target data have been input.

(4) A computer-readable non-transitory storage medium storing a program for causing a computer to execute:

dividing observation data into a training data set and a test data set;

selecting a plurality of pieces of non-target data other than certain target data from a plurality of different types of data included in the training data set divided from the observation data;

selecting a combination of at least three parameters from a parameter set corresponding to each type of the selected plurality of pieces of non-target data;

classifying the non-target data in data densities equal to or greater than a threshold value as clusters and removing the non-target data in the data densities less than the threshold value in a feature space having the parameters of the selected combination as dimensions under certain clustering setting conditions;

generating, for each of the clusters, a model trained to output the target data included in the training data set when the non-target data classified as the clusters is input using a non-linear regression method;

inputting the plurality of pieces of non-target data included in the test data set divided from the observation data to the model generated for each cluster, comparing the target data output from the model to which the plurality of pieces of non-target data have been input with the target data included in the test data set, and evaluating the model on the basis of a result of comparison between the pieces of target data; and selecting a new combination of parameters from the parameter set or changing the clustering setting conditions such that a difference between the target data output from the model and the target data included in the test data set decreases.

(5) The storage medium according to (4), wherein the observation data is flight data of an aircraft equipped with a gas-turbine engine.

(6) A computer-readable non-transitory storage medium storing a program for causing a computer to execute:

acquiring flight data of an aircraft equipped with a gas-turbine engine;

selecting a plurality of pieces of non-target data other than target data from a plurality of different types of data included in the acquired flight data; and inputting the selected plurality of pieces of non-target data to a model trained to output the target data when the plurality of pieces of non-target data are input and determining an abnormality in the aircraft on the basis of an output result of the model to which the plurality of pieces of non-target data have been input.

Although forms for embodying the present invention have been described using an embodiment, the present invention is not limited to such an embodiment and various modifications and substitutions can be made without departing from the spirit or scope of the present invention.

What is claimed is:

1. An information processing method, using a computer, comprising:

dividing observation data into a training data set and a test data set;

selecting a plurality of pieces of non-target data other than certain target data from a plurality of different types of data included in the training data set divided from the observation data;

selecting a combination of at least three parameters from a parameter set corresponding to each type of the selected plurality of pieces of non-target data;

classifying the non-target data in data densities equal to or greater than a threshold value as clusters and removing the non-target data in the data densities less than the threshold value in a feature space having the parameters of the selected combination as dimensions under certain clustering setting conditions;

generating, for each of the clusters, a model trained to output the target data included in the training data set when the non-target data classified as the clusters is input using a non-linear regression method;

inputting the plurality of pieces of non-target data included in the test data set divided from the observation data to the model generated for each cluster, comparing the target data output from the model to which the plurality of pieces of non-target data have been input with the target data included in the test data set, and evaluating the model on the basis of a result of comparison between the pieces of target data; and selecting a new combination of parameters from the parameter set or changing the clustering setting conditions such that a difference between the target data output from the model and the target data included in the test data set decreases.

2. The information processing method according to claim 1, wherein the observation data is flight data of an aircraft equipped with a gas-turbine engine.

3. The information processing method according to claim 1, wherein the computer is configured to preferentially select, from the plurality of pieces of non-target data included in the test data set, non-target data closer to the non-target data included in the training data set than other pieces of non-target data, and input the selected non-target data to the model.

4. The information processing method according to claim 1, wherein the computer is configured to:

select the new combination of parameters from the parameter set, classify the non-target data in the data densities equal to or greater than the threshold value as new clusters and removes the non-target data in the data densities less than the threshold value in a new feature space having the parameters of the newly selected combination as dimensions under the clustering setting conditions;

generate, for each of the new clusters, a new model trained to output the target data included in the training data set when the non-target data classified as the new clusters is input, and input the plurality of pieces of non-target data included in the test data set divided from the observation data to the model newly generated for each cluster, compares the target data output from the model to which the plurality of pieces of non-target data have been input with the target data included in the test data set, and evaluate the newly generated model on the basis of a result of comparison between the pieces of target data.

5. The information processing method according to claim 1, wherein the computer is configured to:

change the clustering setting conditions, classify the non-target data in the data densities equal to or greater than the threshold value as the new clusters and removes the non-target data in the data densities less than the threshold value in the feature space having the parameters of the selected combination as dimensions under the changed clustering setting conditions, generate, for each of the new clusters, the new model trained to output the target data included in the training data set when the non-target data classified as the new clusters is input, and input the plurality of pieces of non-target data included in the test data set divided from the observation data to the model newly generated for each cluster, compare the target data output from the model to which the plurality of pieces of non-target data have been input with the target data included in the test data set, and evaluate the newly generated model on the basis of a result of comparison between the pieces of target data.

6. The information processing method according to claim 1, wherein the computer is configured to newly select the parameter combination in which at least one parameter type is different compared to the previously selected parameter combination.

7. The information processing method according to claim 1, wherein the computer is configured to newly select the parameter combination in which a number of parameters is different compared to the previously selected parameter combination.

8. The information processing method according to claim 1, wherein the computer is configured to select the new parameter combination from the parameter set using an optimization method or changes the clustering setting conditions.

9. The information processing method according to claim 1, wherein the computer is configured to evaluate, as highest, a model for which a difference between the target data output from the model and the target data included in the test data set is smallest, among the plurality of generated models.

10. An information processing apparatus comprising:

a divider which is configured to divide observation data into a training data set and a test data set;

a first selector which is configured to select a plurality of pieces of non-target data other than certain target data from a plurality of different types of data included in the training data set divided from the observation data by the divider;

a second selector which is configured to select a combination of at least three parameters from a parameter set corresponding to each type of the plurality of pieces of non-target data selected by the first selector;

a classifier which is configured to classify the non-target data in data densities equal to or greater than a threshold value as clusters and removes the non-target data in the data densities less than the threshold value in a feature space having the parameters of the combination selected by the second selector as dimensions under certain clustering setting conditions;

a generator which is configured to generate, for each of the clusters, a model trained to output the target data included in the training data set when the non-target data classified as the clusters by the classifier is input using a non-linear regression method; and an evaluator which is configured to input the plurality of pieces of non-target data included in the test data set divided from the observation data by the divider to the model generated by the generator for each cluster, compare the target data output from the model to which the plurality of pieces of non-target data have been input with the target data included in the test data set, and evaluate the model on the basis of a result of comparison between the pieces of target data, wherein the second selector is configured to select a new combination of parameters from the parameter set such that a difference between the target data output from the model and the target data included in the test data set decreases, or the classifier is configured to change the clustering setting conditions such that the difference between the target data output from the model and the target data included in the test data set decreases.

11. The information processing apparatus according to claim 10, wherein the observation data is flight data of an aircraft equipped with a gas-turbine engine.

12. The information processing apparatus according to claim 10, wherein the evaluator is configured to preferentially select, from the plurality of pieces of non-target data included in the test data set, non-target data closer to the non-target data included in the training data set than other pieces of non-target data, and inputs the selected non-target data to the model.

13. An abnormality determination system comprising:
the information processing apparatus according to claim 11; and
an abnormality determination apparatus,
wherein the abnormality determination apparatus comprises:
an acquirer which is configured to acquire flight data of an operation target aircraft equipped with the gas-turbine engine;
a third selector which is configured to select the plurality of pieces of non-target data from a plurality of different types of data included in the flight data acquired by the acquirer; and
a determiner which is configured to input the plurality of pieces of non-target data selected by the third selector to the model generated by the generator and determine an abnormality in the operation target aircraft on the basis of an output result of the model to which the plurality of pieces of non-target data have been input.

14. The abnormality determination system according to claim 13, wherein the determiner is configured to determine that an abnormality has occurred in the operation target aircraft when the target data output from the model to which the plurality of pieces of non-target data have been input is not consistent with the target data included in the flight data acquired by the acquirer.

15. The abnormality determination system according to claim 13, wherein the abnormality determination apparatus further comprises:
a communicator which is configured to communicate with a terminal device usable by a technician who determines whether the aircraft needs to be repaired; and
a communication controller which is configured to transmit a determination result of the determiner to the terminal device through the communicator.

\* \* \* \* \*